United States Patent [19]

Hendershot, III et al.

[11] 3,825,948

[45] July 23, 1974

[54] HIGH SPEED THERMAL DUPLICATION OF MAGNETIC TAPE

[75] Inventors: William B. Hendershot, III, San Jose; David Wald, Santa Clara; Larry K. Whitlock, San Jose, all of Calif.

[73] Assignee: Consolidated Video Systems, Inc., Santa Clara, Calif.

[22] Filed: Dec. 11, 1972

[21] Appl. No.: 313,710

[52] U.S. Cl. .................................... 360/16, 360/71

[51] Int. Cl. ............................................ G11b 5/86

[58] Field of Search ............ 179/100.2 E; 242/56.2, 242/56.4, 75.43, 75.3; 346/74 MT

[56] References Cited

UNITED STATES PATENTS

| | | | |
|---|---|---|---|
| 3,161,120 | 12/1964 | Timares et al. | 179/100.2 E |
| 3,355,076 | 11/1967 | Cheney et al. | 226/95 |
| 3,541,577 | 11/1970 | Lemke | 179/100.2 E |
| 3,633,807 | 1/1972 | Williams | 179/100.2 E |
| 3,699,267 | 10/1972 | Hoell | 179/100.2 E |
| 3,703,612 | 11/1972 | Higashida et al. | 179/100.2 E |
| 3,721,775 | 3/1973 | Fujimoto et al. | 179/100.2 E |

*Primary Examiner*—Alfred H. Eddleman
*Attorney, Agent, or Firm*—Townsend and Townsend

[57] ABSTRACT

A system for high speed thermal duplication of a master magnetic tape onto a copy magnetic tape utilizing a master tape transport and a copy tape transport for guiding the tapes over an index plate having a hardened tape support surface along predetermined paths between supply stations and take-up stations, the master tape path and copy tape path being coincident over a predetermined length. A removable transfer station interposed in the paths of the master tape and the copy tape transports includes a releasable clamp which yieldingly biases the tapes together along the predetermined distance of path coincidence. A tape heater upstream from the pressure clamp heats the copy tape to a predetermined temperature prior to pressure contact against the master tape. The system provides an adjustable tape, tension control and equalization for the master and the copy tapes, a tachometer for measuring the length of master and copy tapes passing the transfer area, feedback control responsive to the tachometer for adjusting tape tensions, and means for maintaining tape edges of differently sized tape in controlled contact with the index plate.

35 Claims, 33 Drawing Figures

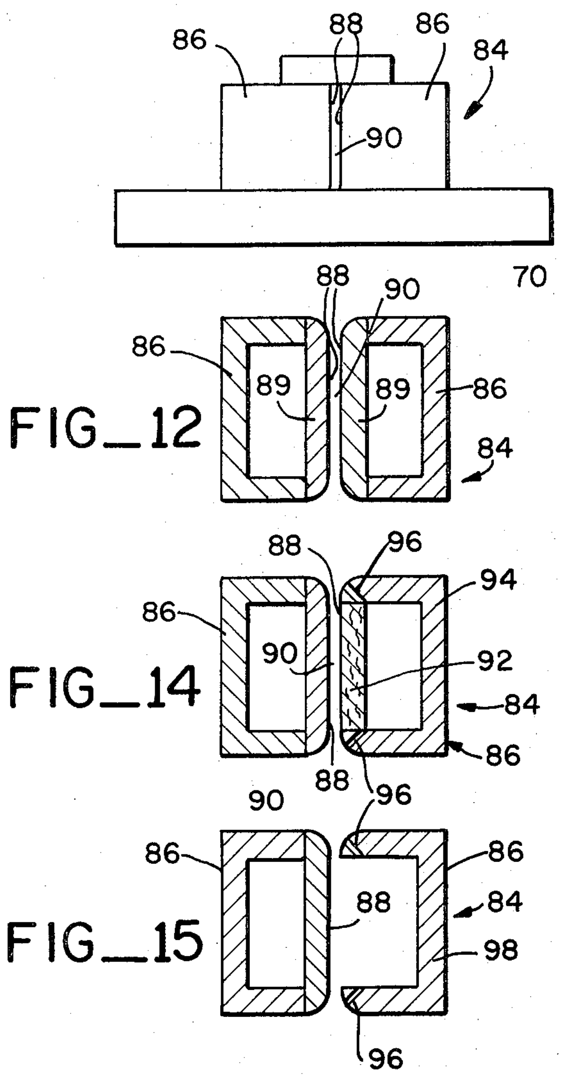
FIG_12A
FIG_12, FIG_14, FIG_15
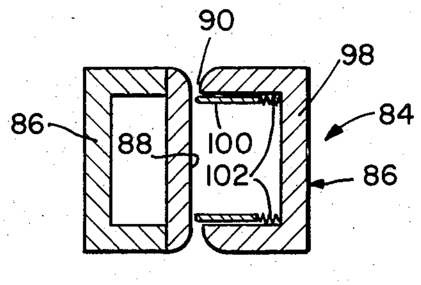
FIG_16
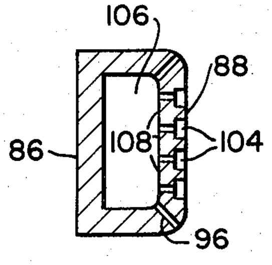
FIG_17A
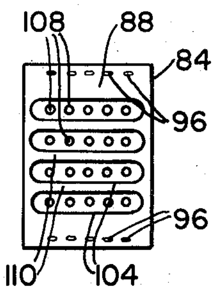
FIG_17B
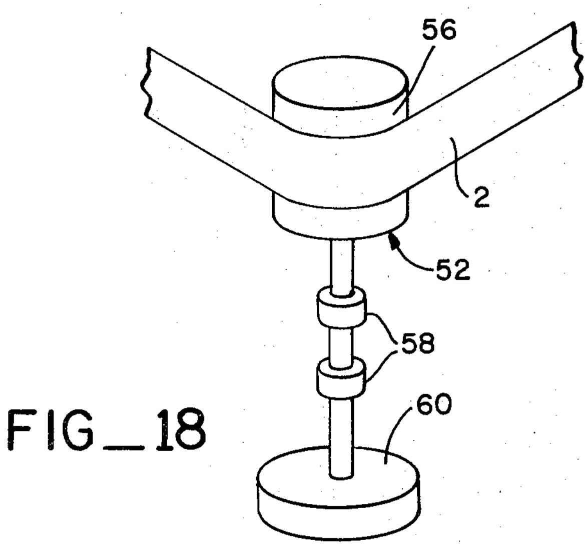
FIG_18
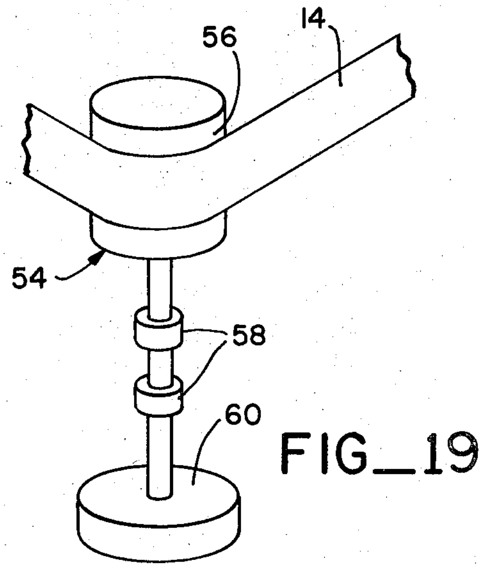
FIG_19

HIGH SPEED THERMAL DUPLICATION OF MAGNETIC TAPE

BACKGROUND OF THE INVENTION

This invention relates to a new and improved system and method for thermomagnetic recording and in particular for high speed thermal duplication of magnetic video tapes.

Conceptually, in thermomagnetic recording a magnetic signal or record member to be reproduced and amplified is placed in intimate contact with a copying member having a support containing a material that is magnetizable to a hard magnetic state. The record member and copying member are subjected to energy whereby the temperature of the copying member is raised to a temperature at least in the vicinity of, that is above the Curie temperature of its magnetizable material, while the original magnetic signal or member is in contact with the copying member. While still in contact, the copying member is cooled from the vicinity of the Curie temperature of its magnetizable material. The result is a mirror image record of the original magnetic signal on the copying member.

More recent developments provide an arrangement in which the heated copy tape and the master tape are brought into contact by an air clamp consisting of porous, sintered jaws through which the tapes are fed for air pressure contact. Such attempts at thermoremanent tape duplication have, however, suffered from the inability to control the relative tensions on the master and copy tapes and the heating of the copy or slave tape. The inability to control these parameters results in tape distortion or distortion of the duplicated signal known as geometric distortion and time base error. Thus, during the transport and handling of the master and copy tapes through the heating of the copy tape and pressure clamping of the master and copy tapes dynamic and static tensional errors in the copy tape during heating and cooling result in distortion of the recorded signal relative to the master signal.

A thermomagnetic tape recorder which overcomes these difficulties is disclosed and claimed in the copending, commonly owned patent application Ser. No. 181,404, filed Sept. 17, 1971 for HIGH SPEED THERMAL DUPLICATION OF MAGNETIC TAPE, now U.S. Pat. No. 3,777,075. The referenced patent provides a master tape transport comprising a supply reel station, a take-up reel station, means for applying predetermined tension to a master tape transported between the stations, and means for guiding the master tape between the stations in a predetermined path. A slave or copy tape transport comprises a supply reel station, a take-up reel station, means for applying predetermined tension to a copy tape transported between the stations, and means for guiding the copy tape between the stations in a predetermined path. The master and copy tape transports are juxtaposed with a portion of the respective master and copy tape paths coinciding. Clamp means is interposed in the paths of the master and copy tape transports for pressure clamping the master tape and copy tapes in intimate contact against each other along the predetermined coinciding length of the paths. A tape heater along the path of the copy tape upstream from the pressure clamping means heats the copy tape to a temperature in the vicinity of the Curie temperature of the magnetizable material used in the tape.

The referenced patent further discloses to contact the tapes over a specified distance by means of air pressure applied at the outsides of the tape. In one example the air pressure clamping is accomplished by a pair of rigidly mounted, opposed, spaced apart, sintered plates defining the coincident portion of the master and copy tape paths as a narrow slit between the plates through which the tapes pass. High pressure air is applied to chambers at the outside of each plate subjecting the master and slave tapes to high pressure contact against each other.

To effect intimate contact between the tapes the slit between the plates is only nominally wider than the thickness of the two tapes. Debris between the tapes, tape splices or irregularities in the tape thickness can sufficiently expand the two tapes so that they engage the sintered plates. During high speed operation this can result in tape breakage damaging one or both of the tapes. Damage to the master tape is particularly serious since the recorded subject matter might thereby be lost.

In that recorder tape tension is closely controlled by a plurality of vacuum columns interposed in the tape transport paths. Each of the vacuum columns operates in association with the reel motor to maintain constant tension on the tape segments between the vacuum columns and isolates the tape segments from undesired mechanical variations and transient forces from the reel mechanisms and reel motors.

Tension differentials and record signal length distortions between the master and copy tape resulting from static and dynamic tension errors as a result of heating the copy tape were sensed and output signals were used to control and vary the tension of the copy tape. Copy tape tension control was accomplished by interposing a fifth vacuum column in the tape transport path of the copy tape transport and varying the vacuum in the fifth column in accordance with the output signals.

Although this arrangement eliminated geometric distortion and time base error in the duplicated signal as a result of the expansion or elongation of the heated copy tape under tension, it is relatively difficult to control and vary the vacuum in the fifth column. The associated equipment is costly, requires substantial maintenance and appreciably adds to the cost of the recorder.

Although the magnetic video tape recorder disclosed in the above-referenced patent functions entirely satisfactorily and is a great improvement over equipment theretofore available, it has some shortcomings. For example, all equipment between the tape supply and tape takeup stations is mounted to a metallic base, usually a flat aluminum plate over which the tape is passed. Continued use, however, has a tendency to wear the plate along the paths which can result in lateral tape misalignments and a poor copy after an extended use of the device. Moreover, each time a new tape copy is prepared, a tedious and time-consuming threading of the tapes between the supply and take-up stations is necessary. This ties up skilled labor and substantially increases copying costs. Furthermore, the manner in which static and dynamic tension errors are corrected to prevent distortions between the master and the copy tapes is relatively cumbersome and expensive and the accuracy of the correction can be no greater than the accuracy with which the vacuum in the fifth column can be controlled. Due to limitations in the vacuum control equipment the control accuracy might have to be compromised.

The device, a relatively large console measuring several feet in length and width is covered by a heavy metallic base plate. At times the heavy plate hampers maintenance or repair, particularly in the vicinity of the transfer station where equipment, such as the air clamps, is located which requires relatively frequent maintenance. Furthermore, if the device is to be used with tapes of varying widths, say ½-inch, ¾-inch and 1 inch tape, it requires timeconsuming replacement of the components in the vicinity of the clamp means. This is particularly true because these components must be in exact relative alignment which requires tedious adjustments.

SUMMARY OF THE INVENTION

The present invention improves the magnetic video tape recorder described in the above-referenced copending patent application in several respects to make it a more practical, more useful and more reliable device and to reduce its overall costs. According to one aspect of the invention, geometric distortion and time base error during duplication due to the heated copy tape under tension is eliminated by measuring the length of both tapes downstream of the tape clamp. Feedback control signals proportional to the tape length issuing from the clamp are generated and a control signal is generated which is proportional to the difference between the two output signals. This control signal is then employed to vary the tape tension.

As in the above-referenced patent tape tension control is preferably made in a fifth vacuum column. Unlike the disclosure in the patent, however, the vacuum in the fifth column is maintained constant. Copy tape tension variations are obtained by tapering the fifth vacuum column, looping the copy tape through the column and controlling the depth to which the tape can enter the column. Depth variations of the tape in the column correspondingly alter the projected area of tape subjected to the vacuum and thereby vary the tension in the tape.

The fifth column is preferably disposed upstream of the transfer area and the feedback control signal is used to briefly accelerate or decelerate an auxiliary capstan for the copy tape to extend more tape into the V-shaped column, to thereby lower the tape tension, or to extend less tape into the column, to thereby increase the tape tension. This arrangement eliminates the need for intricate, costly pneumatic controls which require frequent maintenance. Instead, a relatively simple distance measuring device generates electric control signals which are employed to control the motor for the auxiliary capstan. The operation and maintenance of the magnetic video tape recorder is thereby substantially simplified.

According to another aspect of the invention the heretofore rigid clamps which could damage tape due to lateral tape expansion from debris, splices or variations in the tape thickness are replaced with yielding clamps. The clamps are air clamps, as in the past, in which air pressure is employed to bias the tapes into intimate contact over the coinciding portion of their paths. The clamps are defined by two opposing halves. One half, however, yields in a direction perpendicular to the tape so that variations in the tape thcikness are taken up.

The present invention contemplates the use of a variety of different yielding clamps. Thus, one of the clamps can be defined by a resilient material such as Teflon felt, the pressure from one side can be supplied by an air cushion only or lateral pressure against the tape can be provided from resiliently, e.g. spring mounted, plates or bars. Combinations of these elements can be provided if desired.

To increase the ease with which the recorder of the present invention is operated, and particularly to minimize the required time for threading new tape into the recorder, it is preferred to laterally movably mount the air clamps on linear ball slides or the like. This allows the retraction of the clamp halves for threading new tape so that the tape no longer needs to be threaded into narrow gaps. According to the preferred embodiment of the invention, the laterally movable plates are actuated via a fine adjustable vernier clamp and a pneumatic cylinder.

Further, to facilitate the threading of new tape, it is preferred to mount to the base plate or console movable guide posts that at least initially position the tape on its intended path and facilitate the threading of the tape. A movable guide bar is provided adjacent the vacuum columns and particularly adjacent the fifth vacuum column whereby tape is initially stretched across the mouth of the column. A tape arresting clamp temporarily locks the tape in position and when a vacuum is applied to the interior of the column, the tape is pulled into the column without the need for tediously manipulating the tape into the column. Thus, the magnetic video recorder of the present invention enables a quick and convenient tape loading which reduces machine down times, increases the machine's copying capacity and, thereby, reduces copying costs.

To reduce frictional drag for the tapes, tape guide posts are preferably constructed of an air pervious material, such as sintered metal and connected to a source of high pressure air. This forms an air cushion or air bearing about the posts over which the tape glides. Direct engagement between the tape and the posts, which generates a relatively large amount of friction, is thereby prevented.

Still other aspects of the invention eliminate heretofore encountered problems in guiding and handling the tape during its transfer between the supply and takeup stations and in using the recorder with tapes of varying widths. A metallic, usually aluminum console defines the surface for the tape paths. To prevent wear of the console along the tape path its surface is hard coated such as hard anodized.

Floating plates or lids cooperate with guide means for the master and the copy tapes and gently bias the moving tape into engagement with the hardened console. In the preferred embodiment of the invention the floating lids are mounted to the heater for the copy tape upstream of the air clamp and the transfer station and to a separate master tape guide. An underside of vertically movable lids includes protrusions which overlie the tape path and the lids are permitted to move towards the console a distance slightly less than the width of the tape. In this manner, the lids continuously bias the tapes against the console or other index surface. If desired, the lids can be spring biased against the tape. The lids have a sufficient length to prevent wedging or an uneven pressure distribution between the plates and the tapes over the length of the lids.

The duplicator of the present invention is readily used for copying tapes of varying width, say ½ inch, ¾ inch and 1 inch wide tape by correspondingly adjusting the tape guide lid supports so that the lids can move closer or farther towards the base plate. Similarly, as already described in the above-referenced patent the vacuum columns are readily changed for use with tapes of varying width.

Furthermore, spindles for mounting the tape supply and takeup reels are constructed to readily accept the differently shaped and sized reels for the different tape widths. Consequently, in accordance with the present invention each supply and takeup reel spindle includes an adapter plate secured to a rotating flange permanently mounted to the spindle. The adapter plate includes suitable means for mounting the different tape reels thereto. Thus, the present invention improves magnetic video tape duplicators in a variety of ways to reduce manufacturing and operating costs and to facilitate their handling as well as the reproduction accuracy while reducing the complexity of the duplicators. A less expensive, more reliable device is thus provided as compared to prior art duplicators.

BRIEF DESCRIPTION OF THE DRAWINGS

FIG. 12 and 12A are a plan view and a diagrammatic side view of an air clamp;

FIGS. 14, 15 and 16 are plan views of alternative air clamp structures having at least one laterally yielding half which permits variations in the tape thickness at the transfer station without damaging tape moving through the clamp at high speed;

FIGS. 17 and 17A are plan and side views, respectively, of yet another air clamp;

FIGS. 18 and 19 are diagrammatic perspective views of footage counters for metering the master tape and copy tape, respectively;

DESCRIPTION OF THE PREFERRED EMBODIMENTS

The term "recording" as sometimes used hereinafter in the specification and claims is defined and intended to broadly include magnetic recording and duplication from one tape or other magnetic medium to another. Similarly, the term "thermal magnetic recording" as sometimes used hereinafter is defined and intended to broadly include all duplication and recording of magnetic tape or other magnetic media at elevated temperatures.

Figure 1:
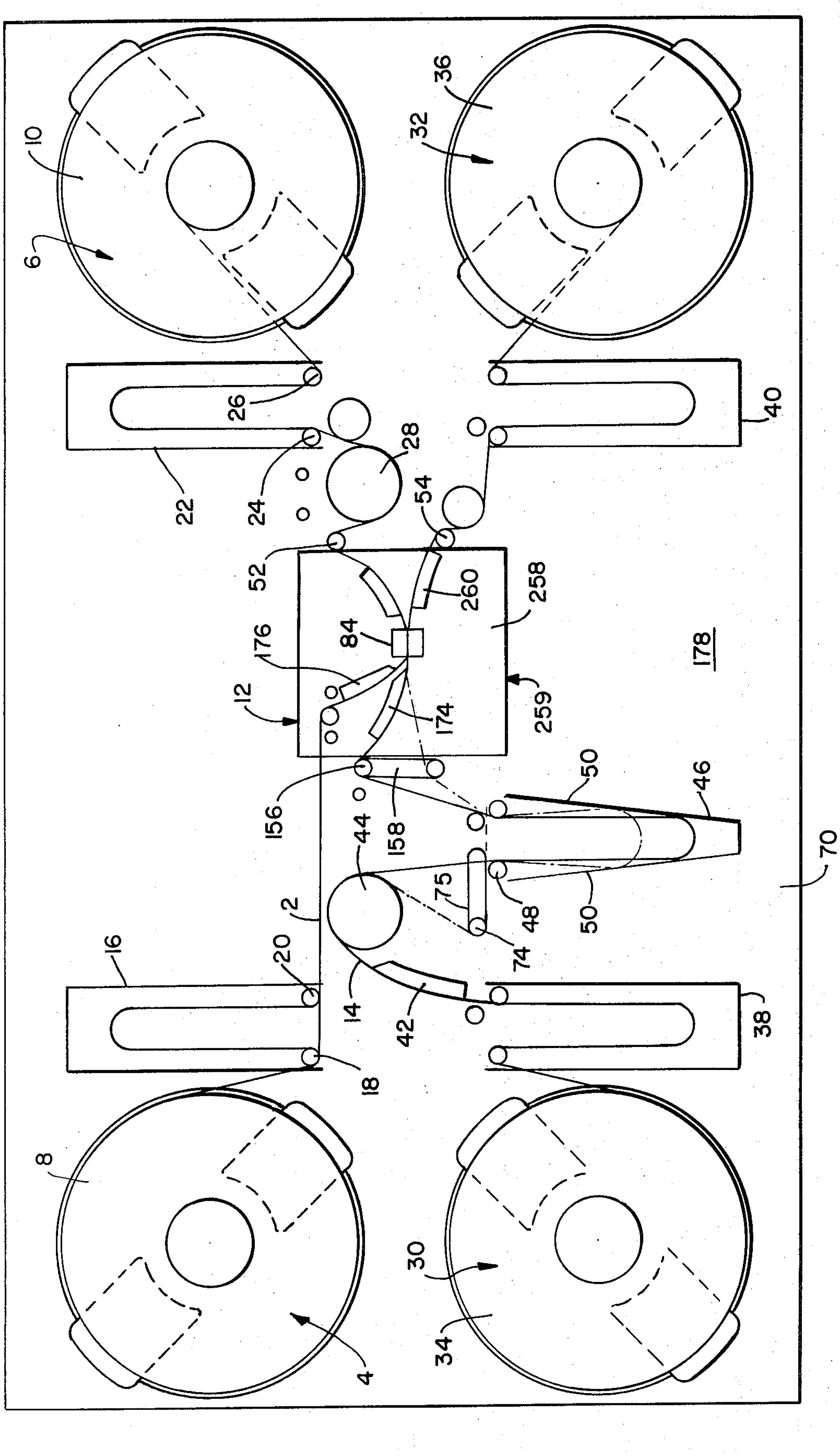
FIG. 1 is a diagrammatic plan view of the thermomagnetic video tape recorder or duplicator constructed in accordance with the invention.

Referring now to FIG. 1, a tape duplicator for the high speed thermal duplication of magnetic tape generally includes a master tape transport for moving a master tape 2 along a predetermined path between a master tape supply station 4 and a master tape take-up station 6. The master tape is transported from a supply reel 8 to a take-up reel 10 through a tape transfer area 12 at which the signal on the master tape is duplicated or recorded onto a copy or slave tape 14. From supply station 4 the master tape passes through a vacuum column 16 by way of air guides 18 and 20. The vacuum column applies a constant vacuum to one side of the tape and thereby places the tape under a fixed tension. It is coupled through a feedback circuit (not shown) to a master supply reel motor (not shown). Each of the air guides 18 and 20 comprises a spindle constructed of a sintered metal or a similar porous material through which pressurized air is vented to guide the master tape 2 around the spindle on an air cushion.

Vacuum column 16 mechanically isolates master tape 2 in the vicinity of the transfer area 12 from the supply station and its supply reel and motor to maintain a constant tension environment for the tape during transfer. A second, downstream vacuum column 22 is associated with the take-up station 6 and its reel and motor (not shown) to isolate the master tape in the transfer area from the take-up station. Air guides 24 and 26 guide master tape 2 through the downstream vacuum column 22. A capstan 28 provides the motive source for driving the master tape. Without the capstan vacuum columns 16 and 22 in association with the reel motors maintain the tape stationary under fixed tension. The capstan therefore drives the tape from the supply to the take-up station. It also drives the copy tape 14 because the master and copy tapes are biased into intimate, immovable contact at the transfer station so that the forward motion of the master tape is imparted to the copy tape.

The duplicator illustrated in FIG. 1 also includes a copy tape transport for guiding the copy tape between a copy tape supply station 30 and a copy tape take-up station 32. Copy tape supply and take-up reels 34, 36 are driven by corresponding motors (not shown) in the same manner as the master tape reels.

An upstream vacuum column 38 coupled through feedback circuitry (not shown) to the copy tape supply reel motor maintains constant tension on the copy tape and isolates it in the vicinity of transfer station 12 from the copy tape supply station 34. Similarly, a downstream vacuum column 40 isolates the copy tape in the transfer area from copy tape take-up station 32 as heretofore described. Sintered posts guide the copy tape through the vacuum columns.

When the copy tape passes through the transfer area 12 it is first heated and thereafter cooled. The heating and cooling sets the tape carrier or substrate, for example, a polyester base, which would distort the transferred signal. A tape preconditioner 42 comprising a heater and a cooler is used to preset the tape prior to recording as is described in the above-referenced copending patent application. An auxiliary capstan 44 is feedback coupled to an upstream fifth vacuum column 46 for the copy tape and is driven by a variable speed motor as more fully described hereinafter.

The fifth vacuum column is interposed in the copy tape path upstream from transfer area 12. Air guides 48 guide the copy tape through the fifth vacuum column. Again, a fixed vacuum is applied to the fifth column. The fifth column, however, is generally V-shaped and includes outwardly opening sides 50 for purposes further described hereinafter.

Referring generally to FIGS. 1–3 and 18–20, geometric distortion and time base error during duplication resulting from the tension applied to the heated copy tape is eliminated by measuring the length of both tapes passing transfer area 12. First and second tape tachometers 52 and 54 are positioned downstream of the transfer area in the path of the master and the copy tapes. The tachometers include identical rotatable heads 56 and low friction mounting means such as ball bearings 58. Tape issuing from the transfer area is looped about the rotatable tachometer head and tensioned thereagainst by the tape tension supplied by the respective vacuum columns. When tape is transferred between the supply and take-up stations heads 56 are rotated at a rate which is a function of the respective tape speeds. Thus, if both tapes move at precisely the same speed both tachometer heads rotate at the same rate. Conversely, if the relative tape speeds differ a corresponding difference in the head rotation rates is present.

Figure 20:
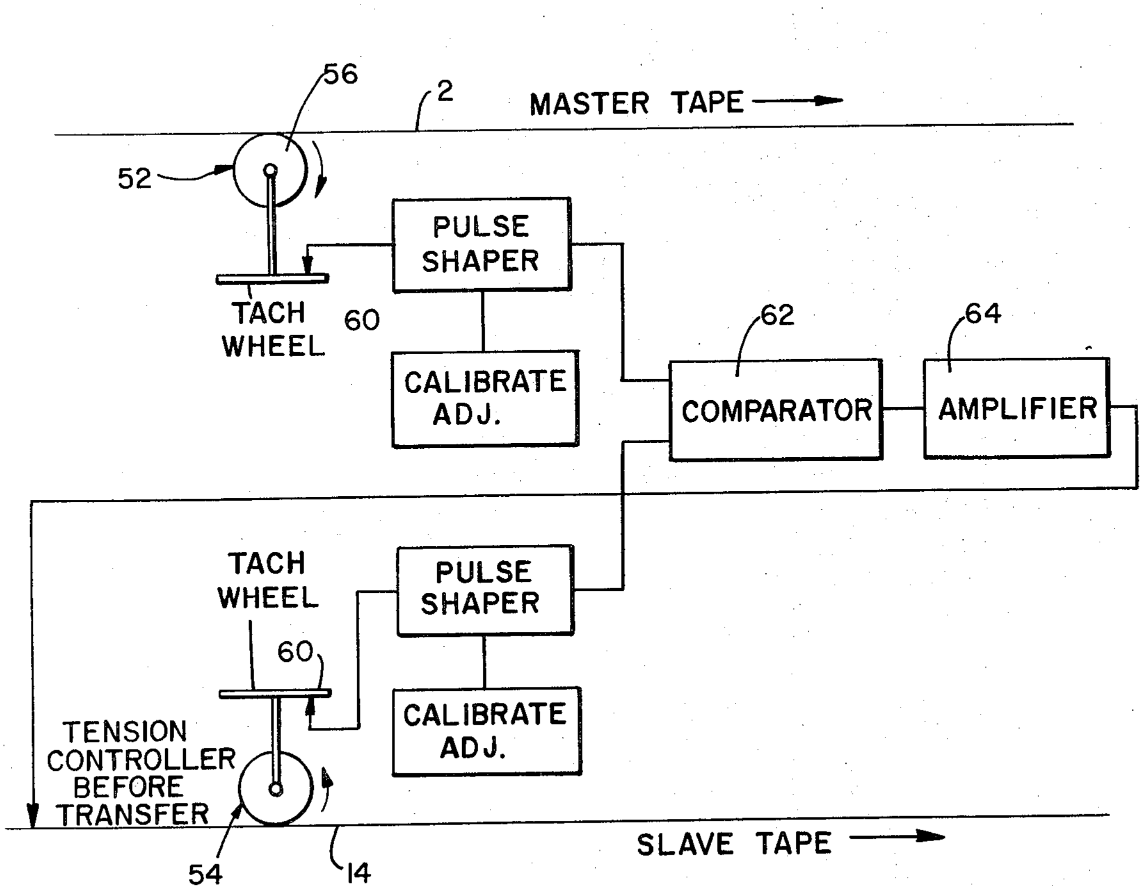
FIG. 20 is a block diagram of the circuitry for generating from the master and the copy tape footage counters a feedback control signal for controlling tension on the copy tape at the fifth vacuum column.

Referring now specifically to FIG. 20, a signal generator 60 is driven by each tachometer which generates a control signal. The control signals from both generators are fed to a differential signal comparator 62 which in turn generates a feedback control signal that is amplified in an amplifier 64 and which is used to control the motor for auxiliary capstan 44. Thus, the feedback control signal either briefly accelerates or decelerates the motor to increase or decrease the length of tape within the fifth vacuum column 46 as a function of the feedback control signal and, therefore, of the relative tape speeds downstream of transfer area 12.

By momentarily decreasing the tape speed with the capstan 44, and thereby decreasing the length of tape in the fifth column, the force applied to the slave tape is increased to correspondingly increase its stretch. Conversely, by momentarily increasing the slave tape speed with the capstan the length of tape in the fifth column is increased and the force on the tape is decreased thus decreasing the stretch on the tape. In this manner the relative speeds of the tapes downstream of the transfer area can be precisely controlled and equalized.

The feedback control signal may also be used to change vacuum level which has the effect of changing tape stretch and thereby the relative tape speed downstream of transfer area 12.

Figures 2, 3:
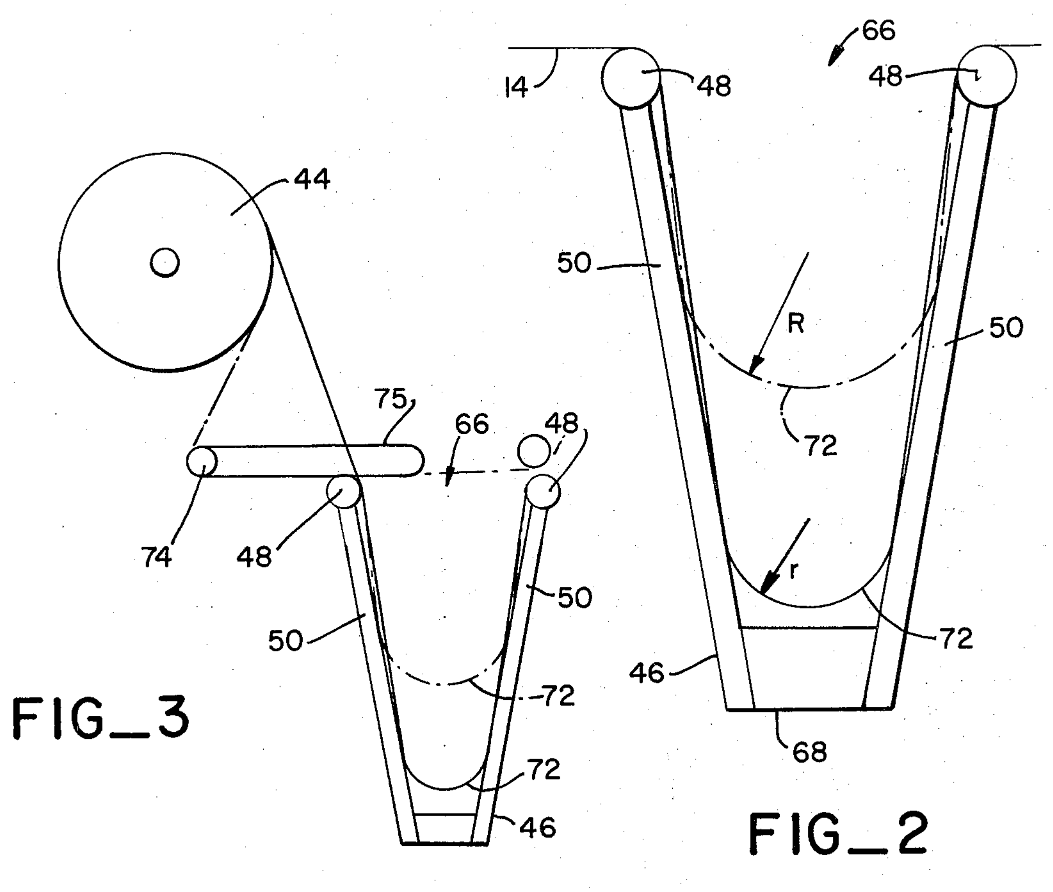
FIG. 2 is a detailed diagrammatic view of a tapered fifth vacuum column used for controlling the tension of the tape at the transfer station.
FIG. 3 is a detailed diagrammatic plan view of an automatic column loader for the fifth column constructed in accordance with the invention.
Figure 4:
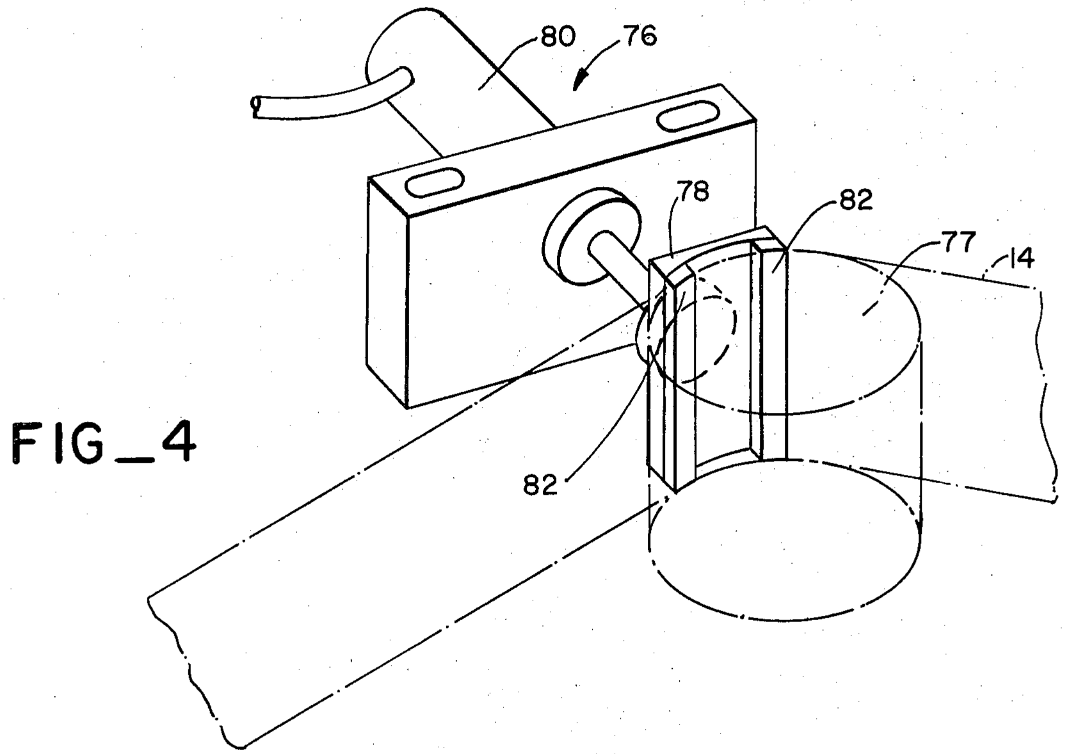
FIG. 4 is a perspective diagrammatic elevational view of a pneumatic piston actuated tape grip for temporarily holding a length of tape against an air guide to permit the loading of vacuum columns.

Referring now particularly to FIGS. 2 and 3, it has already been mentioned that the vacuum in fifth column 46 remains constant. Its sidewalls 50 are tapered inwardly from a column mouth 66 towards the bottom 68 of the column. The sidewalls are mounted on base plate or console 70 of the duplicator and include a cover (not separately shown in the drawings) which is spaced from the base plate a distance substantially equal to the width of copy tape 14. The construction of the cover of the vacuum column is described in greater detail in the above-referenced copending patent application.

When a length of tape is extended past mouth 66 into the fifth vacuum column and a vacuum is applied ambient pressure applies a force to an innermost portion 72 of the tape. The inner most tape portion is generally circularly curved and its ends contact the sidewalls and form a seal. The pressure differential between the side of the tape facing mouth 66 and the side of the tape facing column bottom 68 times the diameter of the curved innermost tape portion 72 determines the force applied to the tape. Thus, if a relatively long length of tape extends into the fifth vacuum column the tape is adjacent column bottom 68. The total tension force applied to the tape then is approximately $F = 2r \cdot \Delta p \cdot w$; when a relatively lesser length of tape extends into the vacuum column, as indicated in FIGS. 2 and 3 in phantom lines, the tension force applied to the tape is $F = 2R \cdot \Delta p \cdot w$ wherein $\Delta p$ is the pressure differential and $w$ is the tape width. Since $R > r$ due to the greater distance between sidewalls 50 adjacent column mouth 66, the resulting tape tension is increased the less tape there is in the fifth vacuum column. The tape tension is varied by briefly accelerating or decelerating auxiliary capstan 44 in the above-described manner. Relatively costly, complciated and fail-prone pneumatic control equipment to regulate the vacuum in the columns is no longer necessary.

The actual recording on the copy tape takes place while the master and the copy tape are in intimate contact. The contact must be firm and present relative movements between the tapes to assure high quality recording.

Referring now to FIGS. 12 and 14–17B, and first in particular to FIGS. 12 and 12A, the tapes can be conveniently contacted while they move at high speed but remain stationary relative to each other in an air clamp 84. Such a clamp generally comprises two halves 86 which have opposing, spaced apart surfaces 88 between which the master and the copy tapes pass. The halves are hollow and walls or sides 89 defining surfaces 88 are air pervious, that is they are constructed of an air pervious material such as a sintered metal. High pressure air in the hollow interior of each clamp half passes through the air pervious sides, forms an air bearing between each surface 88 and the tapes and biases the tapes passing in the gap 90 between the two surfaces into intimate contact. As already described, the copy tape is heated above the Curie temperature when it initially contacts the master tape at the upstream end of gap 90 and cools down through the Curie temperature while it is in intimate contact with the master tape and before it arrives at the downstream end of the gap. Once the tapes move past the gap the force biasing them into contact is released and each tape moves on to its respective tape take-up station.

For proper contact and dimensional control gap 90 must have a width only slightly larger than the combined width of the two tapes. When debris, dust particles and the like are present between tapes, when there are variations in the tape thickness, or when there are tape splices, the width of gap 90 might be less than the overall width of the two tapes. In such an instance, the tapes which move at high speed through the clamp can contact clamp surfaces 88, wedge therebetween and they may break or be otherwise damaged.

Such damage is avoided by resiliently mounting at least one of the opposing clamp surfaces 88 so that lateral tape expansion is possible without damaging the tape. Referring now particularly to FIG. 14, in one embodiment of the invention one surface of the clamps is defined by a felt layer 92. The felt is pressed into a U-shaped channel 94 which defines one of the clamp halves 86. During use when the master and the copy tapes pass through gap 90 air biases the tapes into mutual contact as described above. Lateral expansion of the moving tapes is possible because of the resiliency and ready compressibility of the felt. Heretofore encountered tape damage or breakage is thus prevented.

To facilitate the formation and maintenance of an air cushion or air bearing between the moving tapes and surfaces 88 of the air clamp halves, it is preferred to provide a vertical array of air passages or bores 96 (also shown in FIG. 17B) at the upstream and the downstream end of the clamps. When pressurized air is in the hollow interior of the clamp half, some air escapes through the air bores and forms and maintains an air cushion.

Referring now particularly to FIG. 15, in another embodiment of the invention one half of the air clamp is defined by an open U-shaped channel 98. High pressure air is introduced into the portion of the channel included by its web and legs. Tape passing through gap 90 is biased towards surface 88 of the opposite clamp half. Air passages 96 may again be included to form air cushions in the vicinity of the free end of the channel legs. The remainder of the tpae passing through gap 90 is free to expand laterally into the open space defined by channel 98.

Referring briefly to FIG. 16, in another form air clamp 84 is defined by a conventional half and a laterally resilient half. The laterally resilient half also includes an open U-shaped channel member as does the clamp illustrated in FIG. 15. However, a vertically oriented push plate is positioned at the upstream and the downstream end of the hollow space on the interior of the channel. Helical compression springs 102 yieldingly bias the push plates towards surface 88 of the opposite clamp half. As before, high pressure air is introduced into the interior of both clamp halves 86 and from there against the tape passing through gap 90 to firmly contact the tapes as long as it is within the gap.

Referring now particularly to FIGS. 17A and 17B, in another aspect of the present invention the rigid clamp half 86 of an air clamp 84 may be constructed of one piece and the side of the clamp facing the gap through which the tapes move can be constructed of a non-pervious material by including a plurality of air passages. Preferably, such air passages comprise several vertically oriented grooves 104 which communicate with interior space 86 of the clamp half via a plurality of vertically arranged small diameter bores or conduits 108. The grooves are arranged closely adjacent to each other with a narrow wall 110 therebetween. This arrangement of the grooves provides a substantially homogeneous pressure against the tape passing the clamp half and eliminates the need for sometimes expensive and frequently brittle sintered materials.

In actual use, gap 90 between air clamp halves 86 is very narrow and measures only a few thousandths of an inch. This makes it difficult and time-consuming to insert the two tapes. During high speed operation at least the copy tape must be frequently changed. Consequently, a substantial amount of time is lost due to threading difficulties.

Figures 13, 13A:
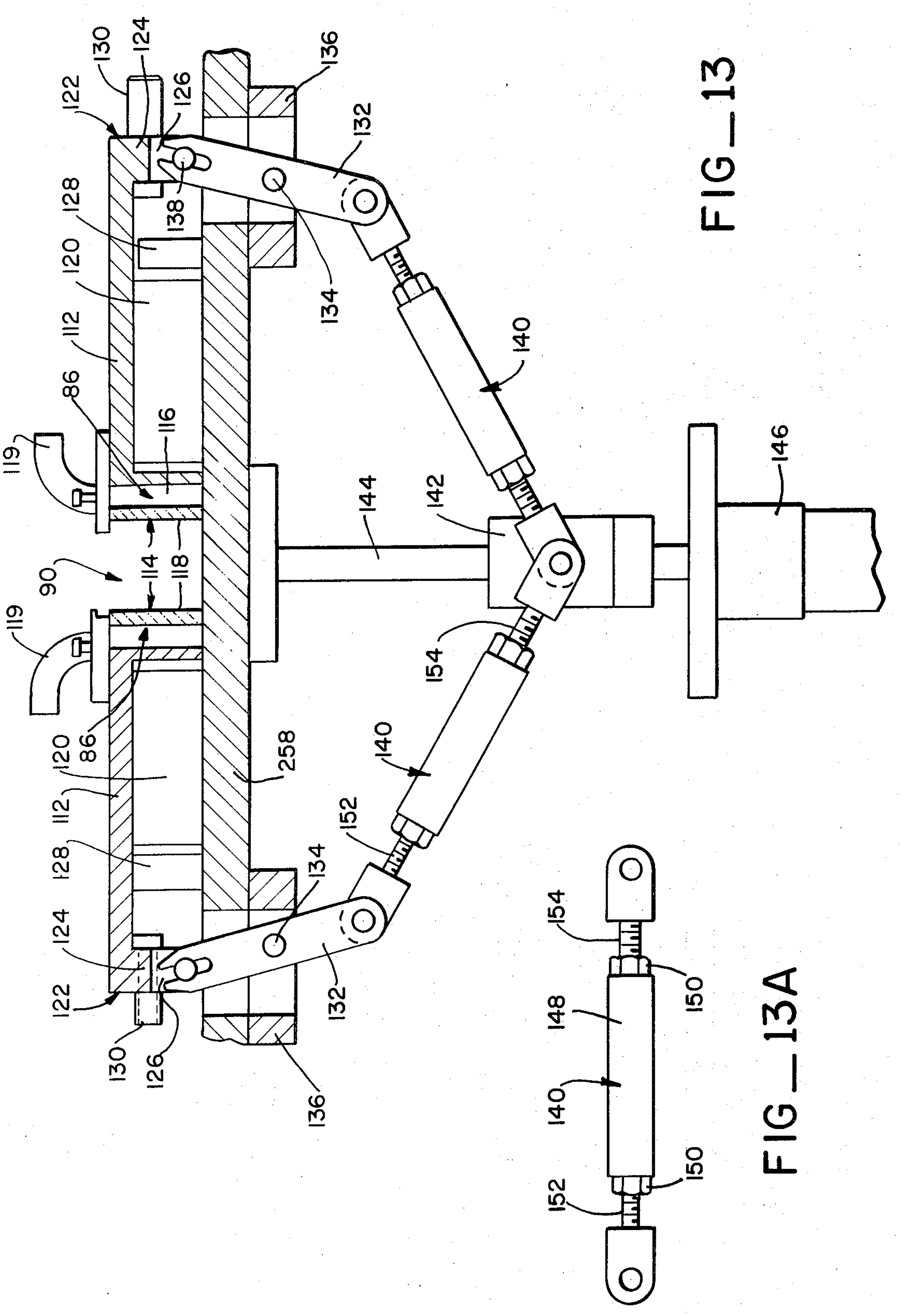
FIG. 13 is a detailed side view, partially in section, of a retractable air clamp assembly in which the air clamp halves are mounted on linear slides and driven together and apart by a piston and lever arms.
FIG. 13A is a detailed side view of a vernier turn buckle lever arm used in the movable air clamp assembly illustrated in FIG. 13.

Referring now to FIGS 1, 13 and 13A, tape threading at air clamp 84 is greatly facilitated in accordance with the invention by retractably mounting clamp halves 86. Each clamp half includes a laterally extending, downwardly opening channel member 112 which extends away from the gap between the halves. An inboard end 14 of the halves is preferably constructed as described in the preceding paragraphs. Thus, a vertical, U-shaped channel 116 is closed with an air pervious member 118 which defines surface 88 facing gap 90. Preferably, one of the air pervious members is yieldingly mounted. An air fitting 119 is provided for each clamp half to supply a high pressure air for biasing the tapes in gap 90 into mutual engagement.

A conventional linear ball slide 120 is disposed beneath each lateral channel member 112 and is mounted to console 70 or another supporting surface. As is well known, the ball slide guides the channel member linearly towards and away from gap 90 with high precision and little friction.

An outboard end 122 of the lateral channel member is defined by a downwardly extending end wall 124 which includes a slot 126 for purposes described hereinafter. Disposed outboard of ball slide 120 and inboard of end wall 124 is an upright post 128. A stop bar 130 is threaded through end wall 124 in alignment with stop post 128. The inner end of the stop bar limits the extent to which clamp halves 86 can be moved towards each other. The adjustability provided by the threaded bar enables one to adjust the width of gap 90. Fine adjustment of that wisth, which can be as little as 0.004 inch, is necessary for satisfactory operation.

Clamp halves 86 are moved towards and away from each other along ball slide 120 by rocker arms 132 pivoted about a pin 134 protruding from a mounting block 136 secured to the underside of console 70. An upper end of each rocker arm is forked, extends into slot 126 in end wall 124 and engages a pin 138 extending through the slot and anchored to the end wall.

A lower end of the rocker arm is pivotally connected by a push rod 140 which in turn is pivotally mounted to a block 142 that can slide along a vertical post 144 depending from the underside of plate 258 mounted to console 70. A pneumatic actuator 146 moves the block up or down and thereby pivots the rocker arms and slides clamp halves 86 towards or away from each other, respectively.

To facilitate the fine adjustment of the clamp movements and particularly of the clamp positioning, push rods 140 comprise vernier turn buckles. Each such turn buckle comprises a center nut 148 and a jam nut 150 on each end thereof. The center nut and the corresponding jam nuts are threaded with the same hand thread, that is they have either a lefthand or a righthand thread, but with threads having different pitches. For example, one end may be threaded with a No. 10–28 righthand coarse thread while the other end is threaded with a No. 10–32 righthand fine thread.

Threaded bolts 152, 154 terminate in a bifurcated free end for engagement with the rocker arms 132 and the sliding block 142, respectively, and they are threaded to match the two threads of the center nut.

When the vernier turn buckle push rod is installed and the jam nuts are loosened rotation of the center nut in one or the other direction moves the center nut to the left or the right with respect to the threaded bolts 152, 154. Since the pitch of the threads of the two bolts differ, however, rotation of the nut also increases or decreases the distance between the bifurcated bolt ends. This change in distance, however, for one revolution of the center nut equals no more than the difference of the pitches of the two threads. In the above example, one rotation of the center nut increases or decreases the distance one two hundred twenty-fourth inch. Precise adjustment of the relative position of the push rods and thus of the clamp halves 86 is thus readily possible. After the vernier turn buckle push rod has been properly set the jam nuts 150 are tightened to lock it at the desired setting.

For maximum utilization of the advantages afforded by the duplicator of the present invention it is important that new tape, say new copy tape, can be threaded through the duplicator with little effort and in a short time. Normally threading is a tedious task because the tape path between the supply and take-up stations is intricate and goes through various equipment, such as the vacuum columns and the air clamps, which is hard to reach. The above-described retractability of the air clamps contributes to the quick threading of the tape. Threading is further enhanced by providing moveable guide posts at strategic locations which are positioned so that the tape can be initially laid in an uncomplicate path between the take-up and supply stations and thereafter, upon actuation of the moveable guide posts, the tape is reoriented into its precise travel path for tape duplication.

Figures 10, 11:
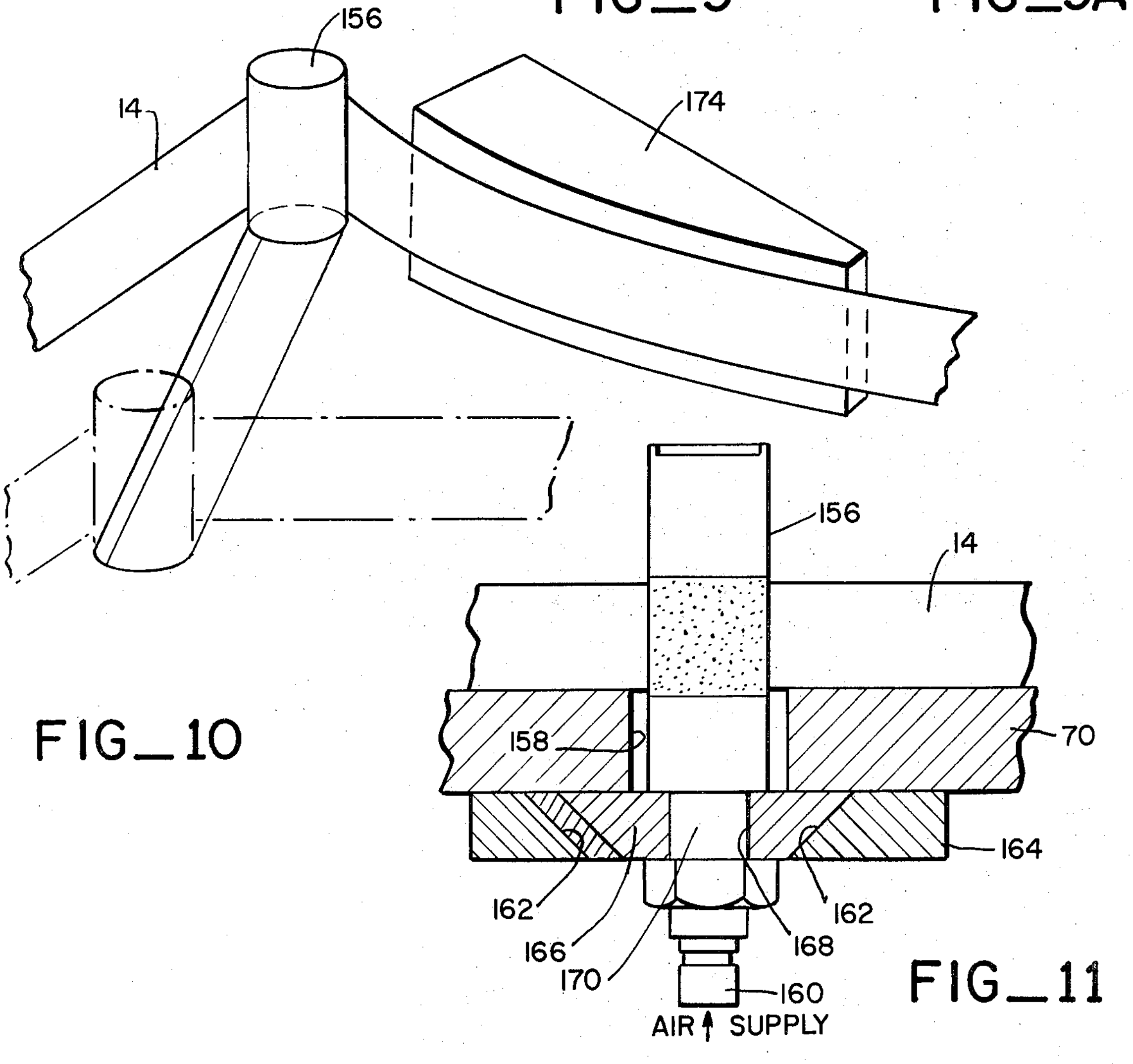
FIG. 10 is a diagrammatic perspective view of a movably mounted mechanical air guide for automatically engaging and disengaging the copy tape with the copy tape heater.
FIG. 11 is a detailed side elevation, in section, of the movable mechanic air guide illustrated in FIG. 10.

Referring now to FIGS. 1–4, 10 and 11, and referring first particularly to FIGS. 10 and 11, such guide posts 156 generally protrude through an elongate linear slot 158 in console 70. The guide posts may be constructed of a sintered material and have a lower end that includes an air fitting 160 for connection to high pressure air so that copy tape 14 (or master tape 2 if the guide post is used in the master tape path) rides on an air bearing or air cushion around the guide post. Guide surfaces 162 for the guide posts are defined by elongate linear bearing blocks 164 mounted to the underside of the base plate. The guide surfaces are angularly inclined with respect to each other and taper apart towards the base plate.

A trapezoidal slide 166 is disposed between the inclined guide surfaces 162 and includes an aperture 168 through which a reduced diameter section 170 of the guide post extends. The post is tightened to the slide with a nut. A conventional wear bar 172 takes up play between bearing block 164 and slide 166.

A suitable pneumatic actuator (not shown in the drawings) is provided to reciprocate guide post 156 and slide 166 in slot 158. For the duplicator illustrated in FIG. 1A, moveable guide post 156 is preferably placed just upstream of copy tape heater 174 which, in turn, is just upstream of air clamp 84. For smooth operation at high tape speeds the heater is convexly curved, as generally indicated in FIGS. 1 and 10, and slot 158 is positioned so that guide post 156 is at the extension of the tape path from the heater. The other end of the slot is located so that upon retraction of the guide post from its operative position tape extends straight to the clamp and does not contact the heater.

Similar moveable guide posts can be provided at desirable locations as, for example, at fifth vacuum column 46. Referring now particularly to FIGS. 1–4, manual tape insertion into the vacuum columns, say fifth column 46, is tedious and time consuming. Preferably, therefore, movable guide posts are provided which initially pass the tape closely past mouth 66 of the vacuum column. For example, with particular reference to the tapered fifth vacuum column 46 a movable guide post 74 is mounted to console 70 and reciprocable in console slot 75 so that copy tape runs from auxiliary capstan 44 across column mouth 66 as indicated in FIG. 3 in dotted lines when the guide post is to the left of the column. A clamping mechanism 76 is suitably positioned, say opposite a stationary guide post 77 at the righthand side of column 46 and includes a pressure ram 78 that can bias the copy tape against that post. Thus, the portion of the copy tape downstream of the fifth column is effectively immobilized. Vacuum can now be applied to the fifth column which draws the copy tape extending across the column mouth into the column interior. Thereafter the vacuum in the column retains the tape therein and clamp mechanism 76 can be released.

The clamp mechanism preferably includes a pneumatic actuator 80 connected to the pressure ram. The side of the pressure ram facing the copy tape includes resilient padding, such as felt or plastic strips 82 which actually engage the copy tape and apply the biasing force. These strips prevent tape damage due to sharp edges or hard surfaces as might occur if the ram were a metallic ram.

After the copy tape has been threaded into the column guide post 74 is moved to the righthand end of slot 75, as viewed in FIG. 3, to its inoperative position (illustrated in phantom lines in FIG. 3) in the vicinity of the column mouth. Post 74 is placed in its inoperative position when the tape is initially threaded to facilitate the ease with which this is done. Thereafter pneumatic actuator 80 is energized to lock the tape to the stationary guide post 77 and guide post 74 is moved to the left (as viewed in FIG. 3) to stretch the tape across the mouth of the vacuum column. Thereafter, the column is vacuumized to draw the tape in. This tape threading mechanism is preferably provided for each master tape and copy tape vacuum column.

Similar moveable guide posts can be positioned at other convenient locations so that when a tape is originally threaded from supply stations 4, 30 to take-up stations 6, 32 the operator can quickly lay the tape in a simple path. Thereafter with the flip of a switch all guide posts can be moved into their operative position, the vacuum in the columns can be applied, the air clamp can be closed, etc., to substantially instantaneously position the tape along its intended path so that tape duplication can commence without delay.

In actual use tape is transported between the supply and take-up stations at high speed. Since the master and the copy tapes 2 and 14, respectively, must be precisely aligned in air clamp 84 it is mandatory to guide the tape laterally as well as longitudinally particularly in the vicinity of the air clamp. Even slight deviations in the lateral (vertical) positioning of the tape must be avoided.

Referring now to FIGS. 1 and 5–9, the flat console 70 is an ideal index surface for the lateral positioning of the tape. Since the tape moves in the same path at all times plate wear can alter the index surface formed by the console. Because the console is relatively thick to provide the required rigidity and weight considerations require that it be constructed of a relatively light material such as aluminum. Aluminum, however, is susceptible to wear. To prevent such wear in accordance with the invention the top surface 178 of the console is hardened, e.g., hard anodized. The hardened surface does not wear even after prolonged use so that proper lateral indexing of the tape is assured.

Referring now to FIGS. 1 and 5–9B, lateral tape indexing further requires that the tape be restrained from moving away from base plate surface 178, particularly in the vicinity and upstream of air clamp 84. Heater 174 is employed to constrain the tape to the top surface of the console. The heater comprises a heating block 180 that has a convex tape contact surface 182 past which the copy tape moves. The heating block includes a plurality of first vertical bores 184 into which heating elements such as electric coils (not shown in FIG. 5) are inserted and a second vertical bore 186 at an upstream end 188 of the block. A vertical elongate narrow slit 190 communicates the second bore with tape contact surface 182. In use, a vacuum source is connected to bore 186 that communicates with slit 190 and movable guide post 156 is positioned so that the copy tape contacts the heater surface 182. As the copy tape moves past the heater surface the vacuum at slit 190 draws the tape into intimate contact with the contact surface 182. As the copy tape moves to the downstream end of the block it is heated above its Curie temperature. From there the copy tape moves immediately to the air clamp for intimate contact with the master tape, a duplication of the magnetic recordings on the master tape, and for cooling down through its Curie temperature range as is well known in the art.

A heater base plate 192 is bolted to underside 194 of heater block 180 with bolts that extend through bores 196 in the base plate and which engage threaded holes in the block. A convex periphery 198 of the base plate extends concentrically slightly past concave tape contact surface 182 of the block when the base plate is bolted to the block and both the base plate and the block are secured into a depression or cut out (not separately shown in the drawings) plate 258 mounted to console 70 so that an upper side 200 of the base plate is flush with the hardened top surface of plate 258 and of the console.

A lid 202 is placed on top of heater block 180 for controlling lateral movements of the copy tape and indexing it against console 70. The lid includes spaced apart bores 204 that engage a pair of vertical pins 206 projecting upwardly from a top surface 208 of heater block 180 for relative vertical movement of the lid. The top surface of the heater block includes generally U-shaped depressions 210 that communicate with tape contact surface 182. An underside 212 of lid 202 is provided with protrusions 214 arranged to coincide with depressions 210 in the heater block and positioned with respect to index bores 204 so that flat surfaces 216 of the protrusions overlie tape contact surface 182 of the heater block. Furthermore, the spacing between bottom 218 of each depression 210 and underside 194 of the heater block, and therewith of upper side 200 of base plate 192, is a few thousandths of an inch less than the tape width. Consequently, the flat surfaces 216 of the lid protrusions 214 engage the upper edge of the tape passing heater 174 and bias it downwardly against base plate 192 for precise lateral positioning.

It is preferred to provide a series of spaced apart protrusions instead of a continuing tape engaging surface, that is instead of providing a flat lid underside because the possibility of tape damage due to a wedged lid or the like is substantially reduced or eliminated. If the heater were simply constructed undersize and a flat plate were provided, the likelihood of creasing, destructing or otherwise damaging the tap, particularly when heated, is relatively high.

Referring now briefly to FIGS. 1 and 8–9B, master tape guide 176 just upstream of air clamp 84 is used to laterally position the master tape in substantially the same manner in which heater 174 laterally positions the copy tape. The master tape guide includes a guide block 220 with a convex master tape contact surface 222 which is, unlike the heater block, directly bolted to top surface 178 of console 70. Upright posts 224 extend through bores 226 in lid 228 for relative vertical movement of the lid with respect to block 220. A top surface 230 of the block also includes a plurality of spaced apart generally U-shaped depressions 232 into which protrusions 234 depending from underside 236 of lid 228 extend. Again, the distance between bottom surface 238 of depression 232 and underside 240 of guide block 220 is slightly less than the width of the tape so that the lid gently biases the tape against the console for lateral indexing. As before, the master guide block includes a plurality of ports 242 at an upstream end 244 of the block through which high pressure air is discharged to form an air bearing between the master tape and the block contact surface 222.

Figures 5, 5A, 5B:
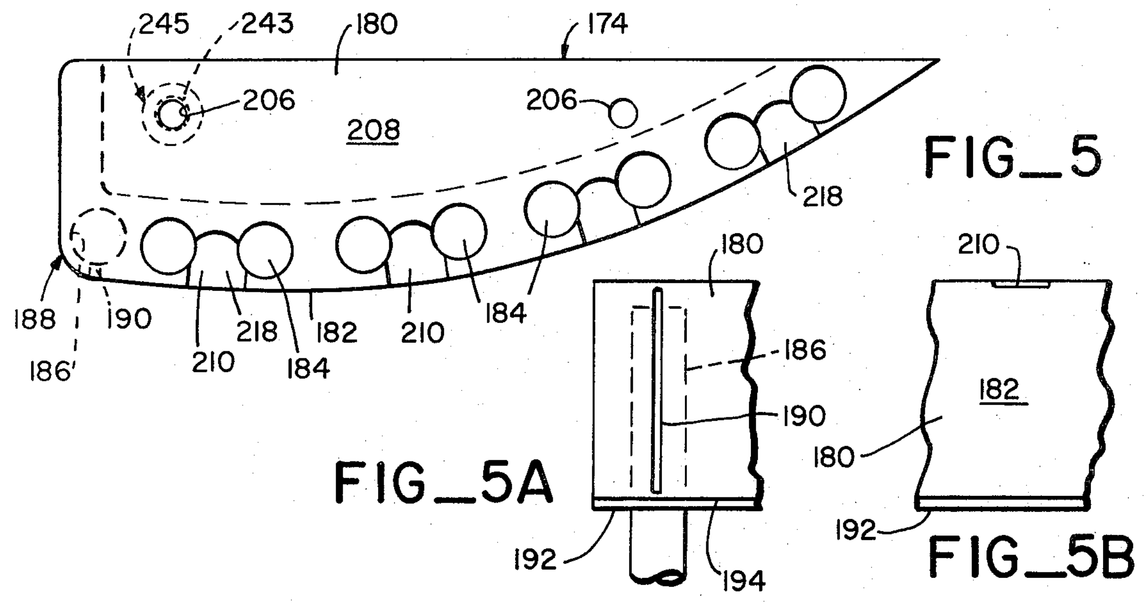
FIG. 5 is a plan view of a copy tape heater constructed in accordance with the invention.
FIGS. 5A and 5B are fragmentary side views of the face of the heater illustrated in FIG. 5 at an upstream end and a center portion, respectively, thereof.
Figure 6:
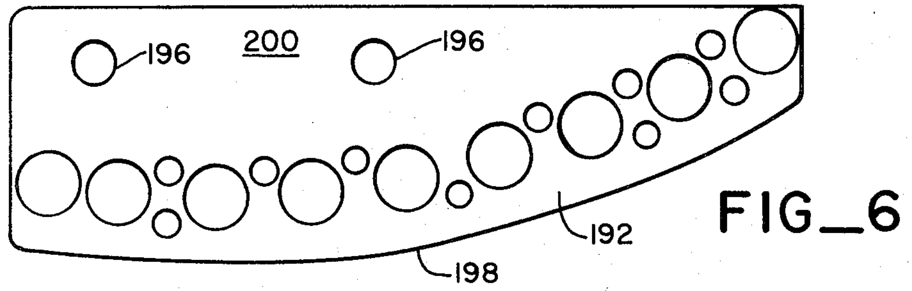
FIGS. 6 and 6A are a plan view and a side view, respectively, of a base plate for the heater illustrated in FIG. 5A.
Figure 6A:
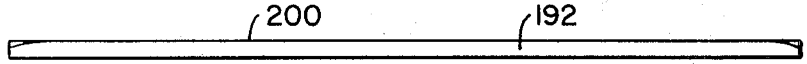
Figure 7:
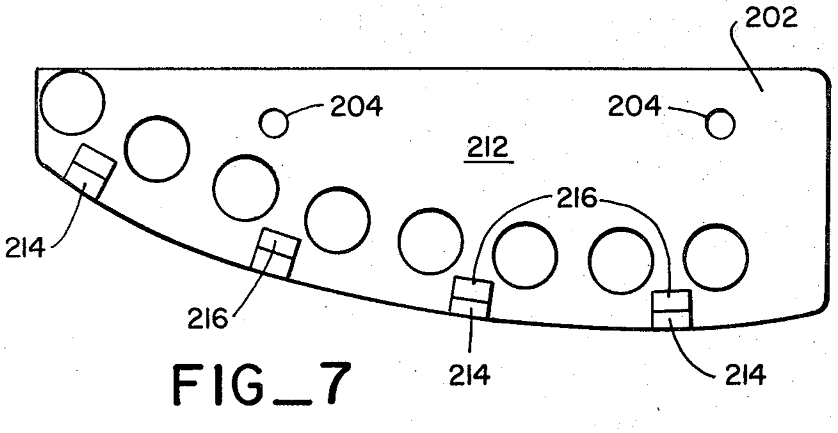
FIG. 7 is a plan view of a biasing or top plate or lid for the heater illustrated in FIG. 5 for biasing copy tape against a base plate of the recorder.
Figure 7A:
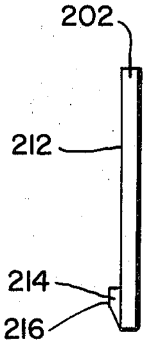
FIGS. 7A and 7B are a side view and a fragmentary front view, respectively, of the biasing plate and particularly illustrate tabs for fingers engaging the moving tape for biasing it against the base plate.
Figure 7B:
Figure 8:
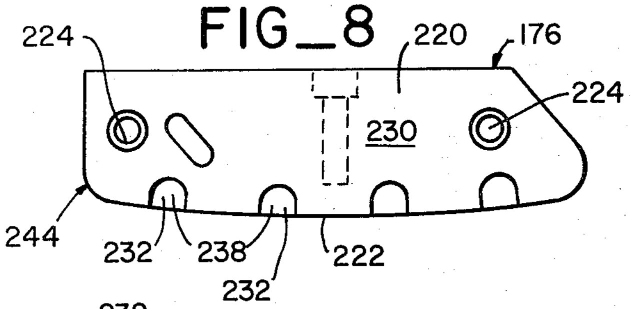
FIG. 8 is a plan view of a guide block for the master tape.
Figure 8B:
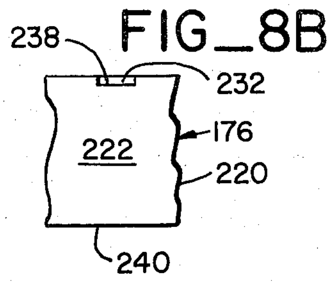
FIGS. 8A and 8B are fragmentary side views of the face of the guide block at its upstream end and a center portion thereof, respectively.
Figure 8A:
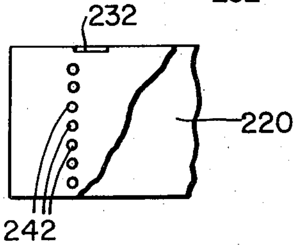
Figure 9B:
FIGS. 9A and 9B are a side view and a front view, respectively, showing the biasing plate tabs or fingers engaging the moving master tape and biasing the master tape against the base plate.
Figure 9:
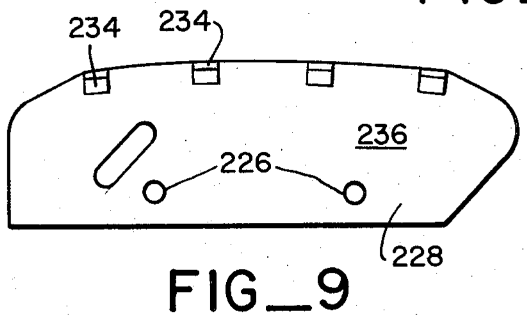
FIG. 9 is a plan view of the master tape guide biasing plate or lid.
Figure 9A:
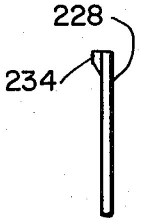

Referring to FIG. 5, under normal operations with a lid thickness of between one-sixteenth to about three-thirtysecond of an inch the weight of the lid is sufficient to bias the moving tape against the index surface, that is against base plate 192 of heater 174, the face of plate 258 or at the master tape guide 176. However, in some instances it might become desirable to spring bias the plates against the tape. For spring biasing upright posts 206 (on heater 174) or 224 (on master tape guide 176) extend above the respective lids, include a head 243 (schematically shown in phantom lines only) and mount between the lid and the head a compression spring 245 (schematically shown in phantom lines only) of the desired strength.

As already mentioned, it is frequently necessary to duplicate tapes of differing width. Referring now to FIG. 1, each time a new tape width is run the components forming the transfer station such as the air clamp 84, the air clamp retracting mechanism, the slave tape heater 174, the master tape guide 176 and the tape coolers 260 downstream of the calmp require replacement. To facilitate such replacement and eliminate the need for tedious adjustments the components are mounted to plate 258 to form a transfer module 259 for each give tape size. Plate 258 is simply bolted or otherwise secured to console 70 and it conventionally and precisely is indexed with index surfaces, dowel pins and the like. Thus, a change-over of the duplicator from one tape size to another requires no more than a simple replacement of the corresponding transfer modules without the need for precision adjustments. The provision of a transfer module further facilitates replacement, repair or maintenance of the components mounted thereon because there is no need to gain access to them from beneath the console which is difficult to reach.

Changes in the tape width normally also require replacement of the supply and take-up reels 8, 10 and 34, 36, respectively since reels for tapes of differing widths usually have differing wheel hub configurations. To eliminate the need for replacing the tape reel spindles an interchangeable reel hold down adapter is preferably provided for each tape reel configuration.

Figure 21:
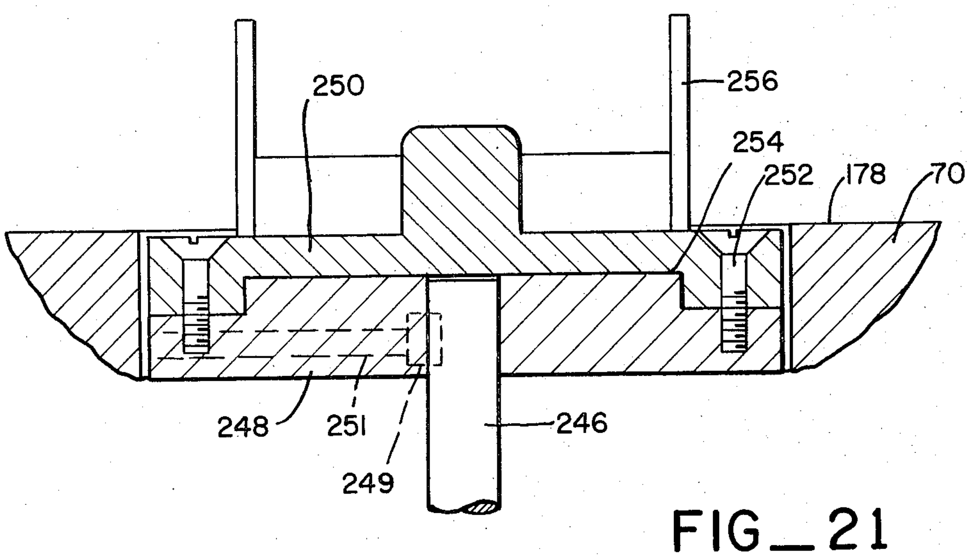
FIG. 21 is a side view, in section, of an interchangeable reel hold down hub for mounting reels holding tape of differing widths at the tape supply and tape takeup spindles.

Referring now to FIGS. 1 and 21, each reel drive at both the supply and the take-up stations comprises a motor driven shaft 246 mounting a circular flange 248 with a key 249 and a corresponding set screw 251 indicated in phantom lines. The flange rotates with the shaft and has a face substantially below console top surface 178. An adapter 250 which has the same circular outline as the flange 248 fits over the flange and is slightly recessed from the console top surface. The adapter is secured to the flange with a plurality of threaded bolts 252 and is centered with respect to the shaft and the flange by a shoulder 254. Suitably formed and arranged members 256 protrude above the adapter and engage the reel for a given size tape. An adapter is provided for each tape reel size and configuration. To use the duplicator with a new size or different type of reel, that is with a reel having a differing hub configuration, a new adapter 250 that corresponds to the new reel is placed on flange 248. This replacement is readily done by loosening threaded bolts 252, replacing the adapter and retightening the bolts. Thereafter the new tape reel is simply dropped over the spindle and engaged with the upwardly protruding members of the new adapter.

I claim:

1. A system for high speed thermal duplication of a master magnetic tape onto a copy magnetic tape comprising: master tape transport means for guiding a master tape between supply and pick-up stations in a predetermined master tape path; copy tape transport means for guiding a copy tape between supply and pick-up stations in a predetermined copy tape path, said copy tape path and master tape path being sustantially coincident over a predetermined length; clamping means positioned at the coincident master tape and copy tape paths for pressure clamping a master tape and copy tape in intimate contact; heater means positioned along the copy tape path upstream from the clamping means for heating a copy tape transported by the copy tape transport means; measuring means for measuring the length of master tape and copy tape transported past said measuring means in the master tape path and the copy tape path respectively, said measuring means positioned downstream from the clamping means; means for generating a feedback control signal proportioned to the measured length difference between said master tape and copy tape; and means for controlling the tension on one of said tapes in accordance with said difference feedback control signal.

2. A system for thermal duplication of magnetic tape as set forth in claim 1 wherein the means for controlling tension on one of said tapes in accordance with the difference feedback control signal comprises a vacuum column having sidewalls open at one end and closed at the other end then tapering from a greater width from the open end to a lesser width at the closed end, said column positioned for receiving a tape across the open end and provided with means for applying low pressure to the closed end for drawing the tape into the column, and means for controlling the depth of the tape in the column whereby the surface area of the tape is exposed to low pressure and therefore the tension of the tape varies according to the controlled depth of the tape in the column.

3. A system for thermal duplication of magnetic tape as set forth in claim 2 wherein is provided a first air guide in the tape path at the downstream side of the open end of the column for guiding said tape at one side of the open end of the column and wherein is provided a second movable air guide in the tape path adjacent and upstream from said first air guide and means for moving said second air guide laterally across the open end of the vacuum column whereby a tape positioned around said air guides is held across the open end of the vacuum column by the movable air guide during loading of the tape into the vacuum column.

4. A system for thermal duplication for magnetic tape as set forth in claim 1 wherein a pair of vacuum columns is provided in each of the master tape and copy tape paths, one downstream from the supply station and one upstream from the pick-up station for isolating the master tape and copy tape in their respective transport paths from the supply stations and pick-up stations, respectively, and wherein there is further provided in each of the master tape path and the copy tape path at least one guide post, and means for clamping the respective tape against said guide post to maintain the tape in stationary position during loading of the tapes into the vacuum columns.

5. A system for thermal duplication of magnetic tape as set forth in claim 4 wherein said clamping means comprises a piston terminating in a face conforming to the shape of the guide post against which a tape is to be clamped, and resilient strips formed along the terminal face of said piston for gripping the tape without injury, and a pneumatic cylinder for driving said piston against the tape and the guide post.

6. A system for thermal duplication of magnetic tape as set forth in claim 1 where in is provided in the copy tape path upstream from said heating means, a movable air guide for engaging and disengaging the copy tape with a copy tape contacting surface of the heating means.

7. A system for thermal duplication of magnetic tape as set forth in claim 1 wherein said measuring means comprises first and second spindles interposed in the master tape and the copy tape paths, respectively, and first and second tachometers coupled respectively with the axes of said spindles.

8. A system for thermal duplication of magnetic tape comprising: master tape transport means for guiding a master tape along a predetermined path from a supply station to a pick-up station; copy tape transport means for guiding a copy tape over a predetermined path from the supply station to a pick-up station, the copy tape and master tape paths being substantially coincident over a predetermined length; air clamp means for applying high pressure air against the outside of the master tape and the copy tape, respectively, at the coincident path length, the air clamp comprising opposed, spaced apart air pressure chambers formed with porous surfaces along the opposing sides of the air pressure chambers dividing the coincident master tape and copy tape path lengths, at least one of the porous surfaces providing a resilient surface for yielding in response to variation in the thickness of tape passing between the porous surfaces to thereby prevent damage to the tapes; and heating means positioned in the copy tape path upstream from the clamping means.

9. A system for thermal duplication of magnetic tape as set forth in claim 8 wherein the at least one yielding surface of the pressure chambers dividing the air clamp comprises a porous surface formed of a resilient material.

10. A system for thermal duplication of magnetic tape as set forth in claim 9 wherein said resilient material comprises Teflon-felt.

11. A system for thermal duplication of magnetic tape as set forth in claim 8 wherein the at least one yielding surface comprises a movable porous surface forming a side of an air pressure chamber, and means spring mounting the movable surface for motion back and forth in the walls of the chamber in response to tape thickness variations.

12. A system for thermal duplication of magnetic tape as set forth in claim 8 wherein the at least one yielding surface of an air pressure chamber is formed by a freely movable porous side wall mounted for moving back and forth between the ends of the air chamber in response to air pressure on one side and tape thickness variations on the other side.

13. A system for thermal duplication of magnetic tape as set forth in claim 8 wherein one of said porous surfaces includes holes having configurations leading from small openings on the inside of the air pressure chamber to larger outlets on the outside for distributing air pressure along the surface of tapes travelling through the air clamp.

14. A system for thermal duplication of magnetic tape comprising: master tape transport means for guiding a master tape along a predetermined path from a supply station to a take-up station; copy tape transport means for guiding a copy tape along a predetermined path from a supply station to a take-up station, the copy tape path and the master tape path being substantially coincident over a predetermined length; air clamp means for applying high pressure air to the outsides of the master tape and the copy tape at the coincident path length comprising a pair of opposed spaced apart air pressure chambers defining the coincident master tape and copy tape paths between opposed sides of the pressure chambers, one of said opposing sides comprising a porous surface, the opposing side of the other air pressure chamber being open for direct delivery of high pressure air; and heating means positioned in the copy tape path upstream from the air clamp means.

15. A system for thermal duplication of magnetic tape as set forth in claim 14 wherein a spring biased guide member is provided at each end of the open side of the open air clamp, said spring biased guide members resting against a tape passing through the air clamp.

16. A system for thermal duplication of magnetic tape as set forth in claim 14 wherein the air pressure chamber formed with said open side is also formed with a row of angularly directed holes at each end of the air clamp in the direction of the tape paths to generate an air bearing for tape passing into and out of the air clamp.

17. A system for thermal duplication of magnetic tape comprising: master tape transport means for transporting a master tape over a predetermined path between a supply station and a take-up station; copy tape transport means for transporting a copy tape over a predetermined path between the supply station and a take-up station, the master tape and the copy tape paths being substantially coincident over a predetermined length; air clamp means for applying pressure air to the outsides of the master tape and the copy tape at the substantially coincident path length, the air clamp means comprising first and second opposed spaced apart air pressure chambers, the chambers being arranged with opposing sides defining path lengths of substantial coincidence and for delivering the high pressure air, track means mounting the air pressure chambers for movement toward and away from the coincident master and copy tape paths; means for moving said air pressure chambers along the track means toward and away from the coincident master and copy tape paths; and heating means positioned in the copy tape path upstream from the clamp means.

18. A system for the thermal duplication of magnetic tape as set forth in claim 17 wherein the means for moving the air pressure chambers toward and away from the coincident tape paths comprises first and second lever arm means coupled at one end respectively to the first and second air pressure chambers and coupled at the opposite ends to a block and means for reciprocating the block for actuating the lever arms and thereby move the first and second air pressure chambers along their respective track means.

19. A system for thermal duplication of magnetic tape as set forth in claim 18 wherein the means for reciprocating the block comprises a pneumatic actuator.

20. A system according to claim 18 wherein the means for reciprocating the block comprises guide bar means slideably engaged by the block.

21. A system for the thermal duplication of magnetic tape as set forth in claim 18 wherein at least one of the first and second lever arm means comprises a Vernier turnbuckle.

22. A system for thermal duplication of magnetic tape as set forth in claim 21 wherein the Vernier turnbuckle comprises a first bolt with a thread of a first pitch, a second bolt with a thread of a second pitch different from said first pitch, the threads having like directions, and an elongate nut simultaneously coupled with the first and second bolts at each end of the nut, the nut being formed with mating threads of the first pitch in one end and of the second pitch at the other end.

23. A system for the thermal duplication of magnetic tape comprising: master tape transport means for driving a master tape along a predetermined path from a supply station to a take-up station; copy tape transport means for driving a copy tape along a predetermined path from a supply station to a take-up station, the master and the copy tape paths coinciding over a predetermined length; and a transfer module comprising air clamp means for applying high pressure air to the outsides of the master tape and the copy tape at the coincident path length, heating means positioned in the copy tape path upstream from the air clamp means, master tape guide means positioned upstream of the clamp means, and cooling means in the master tape and the copy tape paths downstream from the air clamp means, a support plate removably mounted to a console and mounting at least some of the air clamp means, the heating means, the cooling means and the guide means for interchanging the heating means, air clamp means, cooling means and the guide means to accommodate magnetic tapes of different widths and to provide access to them for routine maintenance and the like.

24. A system for the thermal duplication of magnetic tape as set forth in claim 23 wherein the supply and pick-up stations of the master tape transport and copy tape transport respectively comprise supply reel and take-up reel stations, each reel station including an interchangeable reel hold down adapter which is removable and replaceable for accommodating reels for tapes of different widths or for accommodating reels having differing configurations.

25. A system for the thermal duplication of magnetic tape as set forth in claim 23 wherein the air clamp means comprises first and second opposed spaced apart air pressure chambers having opposing sides defining the coincident master tape and copy tape paths and for delivering high pressure air to the outside of the tapes as they pass through the clamp, the air pressure chambers being disposed on tracks mounted to the support plate for motion toward and away from the incident path length, and wherein the system includes means mounted to the support plate for reciprocating the air pressure chambers on the respective tracks.

26. A system for the thermal duplication of magnetic tape as set forth in claim 25 wherein the means for reciprocating the air pressure chambers on the respective tracks comprises first and second lever arm means removably coupled to the first and second air chambers, respectively, and means for actuating said lever arm to reciprocate the air pressure chambers.

27. A duplicator for the high speed thermal duplication of magnetic tape comprising: master tape transport means for guiding a master tape along a predetermined path from a supply station to a take-up station; copy tape transport means for guiding a copy tape along a predetermined path from a supply station to a take-up station, said master tape and copy tape paths being substantially coincident along a predetermined length; air clamp means for applying high pressure air to the outsides of a master tape and the copy tape at the path coincidence length; heating means comprising an elongate surface of heat conducting material positioned along the copy tape path upstream from the air clamp means; master tape guide means forming a master tape guide surface along the master tape path upstream from the air clamp means; means defining a hardened, wear resistant flat surface mounting the master tape transport means, copy tape transport means, air clamp means, heating means and master tape guide means and forming an index surface for an edge of a master tape and of the copy tape: a downwardly biased plate mounted over the heating means and extendingin beyond said heating means over the copy tape path for resting against the upper surface of the copy tape and indexing the copy tape against the flat surface; and a second downwardly biased plate mounted over the master tape guide and extending over the master tape path for resting against the upper surface of a master tape and indexing the copy tape against the flat surface.

28. A duplicator as set forth in claim 27 wherein each of the first and second downwardly biased plates is loosely mounted on vertically disposed guide means for up and down motion in a direction perpendicular to the flat surface.

29. A duplicator as set forth in claim 28 wherein said first and second downwardly biased plates are spring biased.

30. A duplicator as set forth in claim 27 wherein the first and second downwardly biased plates are biased downwardly by gravity.

31. A duplicator as set forth in claim 27 wherein a surface of each of the downwardly biased plates includes spaced-apart protrusions overlying the respective tapes so that the protrusions rest against upper edges of the tapes.

32. A duplicator as set forth in claim 27 wherein each of said heating means and master tape guide means includes a curved surface along the copy tape and master tape paths, respectively, and wherein the heating means surface includes at least one opening at its upstream end subjected to a vacuum, and the master guide means surface includes at its upstream end at least one opening for delivering air pressure to insure intimate contact between the copy tape and the heating means surface and to form an air bearing surface for the master tape, respectively.

33. A method for controlling signal distortion during thermal magnetic tape duplication from a master tape to a copy tape in which the signal recorded on a master tape is duplicated on a heated copy tape in a transfer area comprising: measuring the length of master tape issuing from the transfer area; generating a signal proportional to the length of master tape being measured; measuring the length of copy tape issuing from the transfer area; generating a signal proportional to the length of copy tape measured; generating a signal proportional to the difference of the two signals; and controlling the tension of the copy tape upstream from the transfer area in accordance with said difference signal.

34. A method for controlling and eliminating distortion in a duplicated signal transferred from a master tape to a heated copy tape in a transfer area according to a double duplication process comprising: measuring the rate of passage of master tape from the transfer area and generating a signal proportional to the rate of master tape passage; measuring the rate of passage of the copy tape from the transfer area and generating a signal proportional to the rate of copy tape passage; generating a signal proportional to the difference between the rate of passage of the master and of the copy tapes; and controlling the tension of at least one of the tapes upstream from the transfer area in accordance with the difference signal.

35. A method according to claim 34 wherein the step of controlling the tension comprises the step of subjecting one side of the tape to differential pressures, and including the step of varying the tension by adjusting the length of tape subjected to differential pressures while maintaining the pressure differential constant.

* * * * *